No. 613,548. Patented Nov. 1, 1898.
J. B. YEAGLEY.
PLOW CLEANER.
(Application filed Aug. 17, 1896.)
(No Model.) 3 Sheets—Sheet 1.

Witnesses
F. L. Durand
W. M. Mason

Inventor,
Jacob B. Yeagley.
by John Wedderburn
Attorney

THE NORRIS PETERS CO., PHOTO-LITHO., WASHINGTON, D. C.

No. 613,548. Patented Nov. 1, 1898.
J. B. YEAGLEY.
PLOW CLEANER.
(Application filed Aug. 17, 1896.)
(No Model.) 3 Sheets—Sheet 2.

Witnesses
F. L. Ourand
Inventor,
Jacob B. Yeagley,
by John Wedderburn
Attorney

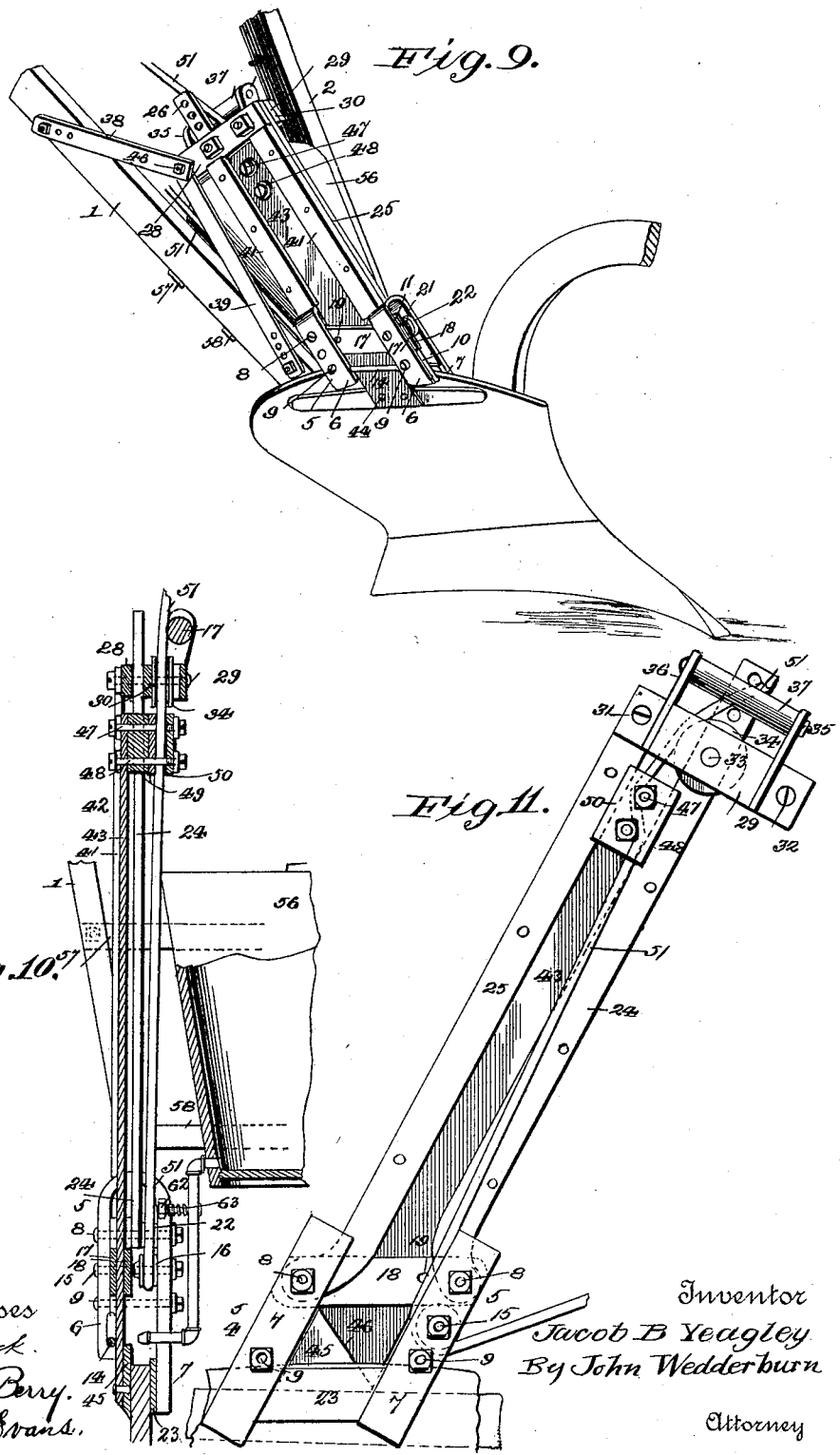

UNITED STATES PATENT OFFICE.

JACOB B. YEAGLEY, OF DENTON, TEXAS.

PLOW-CLEANER.

SPECIFICATION forming part of Letters Patent No. 613,548, dated November 1, 1898.

Application filed August 17, 1896. Serial No. 602,962. (No model.)

*To all whom it may concern:*

Be it known that I, JACOB B. YEAGLEY, a citizen of the United States, residing at Denton, in the county of Denton and State of Texas, have invented certain new and useful Improvements in Plow-Cleaners; and I do hereby declare the following to be a full, clear, and exact description of the invention, such as will enable others skilled in the art to which it appertains to make and use the same.

My invention relates to plow-cleaners.

My object is to provide improved mechanism of novel as well as cheap and simple construction which can be easily applied to a plow, and more particularly a walking-plow, and will be adapted for easy manipulation to clean from the moldboard all accumulation of earth thereon no matter what its consistency, and one which can be adjusted as desirable, so that it can be applied to any shape of moldboard and can be readily operated either when the plow is at work or when idle.

Having this and other minor objects in view, which will appear later on, the present invention consists of a plow-cleaner comprising certain novel devices appearing more fully in the following description and appended claims, as well as in the accompanying drawings, in which—

Figure 1:
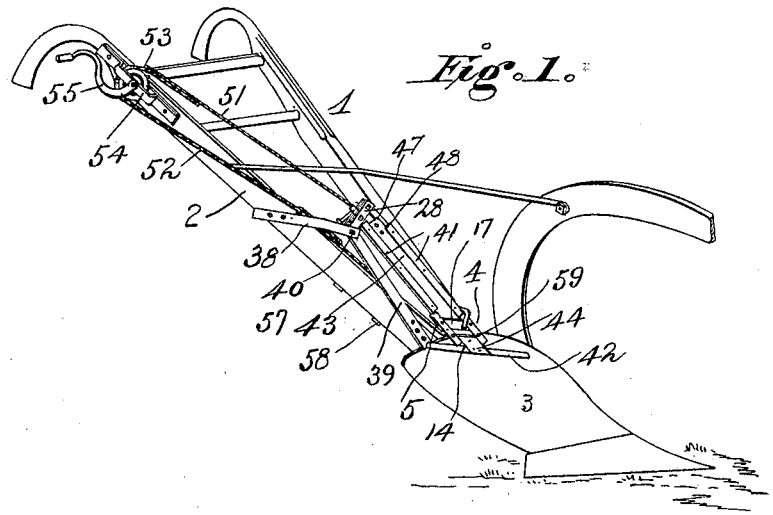
Figures 2, 7:
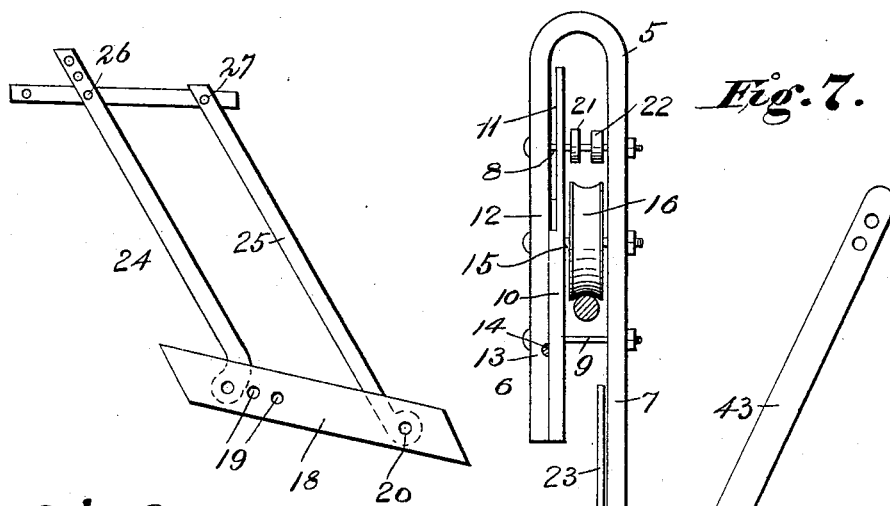
Figure 8:
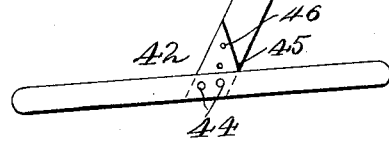
Figure 4:
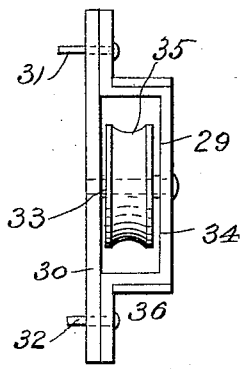
Figure 5:
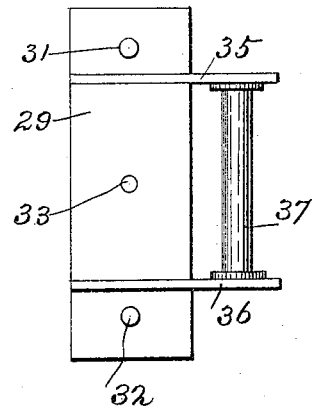
Figures 3, 6:
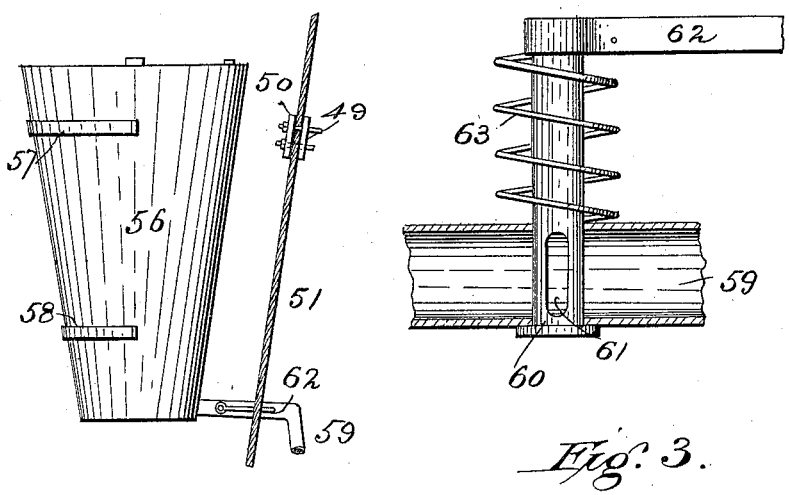

Figure 1 is a perspective view of a plow provided with my cleaning device with the tank omitted. Fig. 2 is a detail view of the standards 24 and 25 and the plate 18. Fig. 3 is a detail view of the valve 6. Fig. 4 is a similar view of the pulley 35 and its bearings. Fig. 5 is a detail view of the roller 37. Fig. 6 is a detail view of the tank and portion of some of its connected parts. Fig. 7 is a detail view of the clamp 5. Fig. 8 is a similar view of the cleaning-knife and its supporting-spring. Fig. 9 is a view of a portion of a plow, my attachment applied thereto illustrated on a somewhat larger scale than in Fig. 1. Fig. 10 is a sectional vertical view through the cleaning device, showing the manner of its attachment to the moldboard and illustrating the relation of the tank, a portion of which is broken away; and Fig. 11 is a side elevation of the cleaning device prepared on a somewhat enlarged scale.

The numerals 1 and 2 designate the plow-handles, and 3 the moldboard, of a walking-plow of ordinary construction.

At 4 and 5 are shown rear and front clamps, respectively, whose construction will now be given. Each clamp is made from a single piece of metal, which is bent to form two downwardly-projecting arms 6 and 7, the latter being somewhat longer than the former. At 8 and 9 are shown upper and lower bolts, which pass through the arms of the clamp. Each clamp is provided with these bolts.

The numeral 10 designates a clamping-plate which has its upper portion cut away, so that the plate is reduced in thickness, as at 11, and an inclined shoulder 12 is provided. The bolts 8 and 9 pass through the thin and thick portions, respectively, of the clamping-plate. The upper edge of the moldboard is straddled by the arms of the clamps, and by means of the bolts said clamps are held in position by frictional contact with the moldboard. It will be observed that in the arms 6 of the clamps there are made inside grooves 13, which lie immediately adjoining the bolts 9.

The numeral 14 designates a cylindrical cleaning wire or rod, which has its ends lying in the groove and extends across from clamp to clamp, being held in position by the respective clamping-plates. This cleaning-wire is employed to remove from a flat spring-arm any earth that may have adhered thereto.

In addition to the upper and lower bolts, which are employed in connection with both of the clamps, there is a centrally-disposed bolt 15, which passes through the arms of clamp 4, and on this bolt is loosely journaled a pulley 16, which serves a purpose to be described later on.

I employ two guide-plates 17 and 18, and both of these are provided with a series of holes 19 at one end and a single hole 20 at the other end. The guide-plate 17 has its ends located between the arms 6 of the clamps and the reduced portions 11 of the clamping-plates. The bolt 8 of the clamp 4 passes through one of the openings 19, while the bolt 8 of clamp 5 passes through opening 20. The guide-plate 18 is disposed in the same manner as the other guide-plate, but its ends lie outside of and immediately against the reduced portions 11 of the clamping-plates.

Sets of washers 21 and 22 are located on the respective bolts 8 of the clamps. In addition to these guide-plates there is another plate 23, which is located against the back side of the moldboard and in contact with the longer arms 7 of the clamps. It extends between the latter. There are two standards, a rear and a front one, (designated by the numerals 24 and 25.) The bolts 8 of the respective clamps pass through the lower ends of these standards, said ends being located between the rear guide-plates and the washers 21 and 22, and the rear standard 24 is provided with a series of openings 26, while standard 25 has a single opening 27. At 28 is shown a front cross-bar, which extends from the upper end of the front standard to the rear standard and thence outwardly. On the rear side of the standard there is located a housing 29 and a base-plate 30 therefor. Bolts 31 and 32 pass through the housing and the base-plate, through the holes in the upper ends of the standards, and finally through the plate 28. In this housing and journaled on a spindle 33 is a grooved pulley 34. Projecting from the pulley-housing are two lips 35 and 36, and the numeral 37 represents a roller which is journaled in said lips and has its axis extending substantially at right angles to the spindle of the pulley 34. At 38 and 39 are shown adjustable braces, which are connected by a bolt 40 to the projecting ends of the pulley-housing, its base-plate, and plate 28. It will be observed that by adjusting the lower and upper ends of the rear standards in relation to the guide-plates and the cross-piece 28, pulley-housing, and its base-plate the inclination of the clamps can be varied, as desirable, so that the cleaning-knife, to be described later on, can be operated at the necessary angle to perfectly clean the moldboard. Each standard is provided with a guide 41.

My improved cleaning-knife is designated by the numeral 42. It is simply a blade of metal of proper length for the moldboard, extending transversely thereof and provided with upper and lower cutting edges. I employ a long flat ribbon-spring 43, which is adapted for sliding movement between the guides 41, the guide-plates, and clamping-plates 10 and under the cleaning-wire. The cleaning-knife is fastened to the lower end of this spring by rivets 44 at a proper inclination in relation thereto. I prefer a rivet connection, so that by filing off the rivets the knife can be removed whenever desirable, and the same knife or a longer or shorter one can be riveted to the spring. At 45 is shown a triangular cutting-knife, the inclined edge 46 of which extends obliquely to the longitudinal axis of the spring and is peculiarly adapted to scrape off from the moldboard during the upward movement of the cleaning-knife any earth that has adhered thereto and to elevate the same and to pass it back over the upper edge of the moldboard.

The numerals 47 and 48 designate bolts which pass through the upper end of the ribbon-spring and through a plate between and a little thicker than the standards, and under the heads of which bolts are located suitable washers, two clamping-plates being shown at 49 and 50, and through which the rear ends of the bolts pass and are provided with suitable nuts.

The numeral 51 designates the operating cable or rope. This passes over roller 37, thence over pulley 34, between the clamping-plates 49 and 50, and around pulley 16, and to its ends is connected a sprocket-chain 52.

The numeral 53 designates a sprocket-wheel which is journaled in a bracket 54, connected to the upper portion of the plow-handle 2, and 55 designates an operating-handle for turning said sprocket. The sprocket-chain passes over the sprocket.

It is desirable and sometimes even necessary to moisten any earth that is clinging to the knife, spring, or moldboard, so as to loosen it up and insure its easy and quick removal. I therefore find it desirable to employ means for projecting on the said parts a stream of oil or water, and the mechanism for accomplishing this purpose will now be described.

The numeral 56 designates a tank which is made in the shape of an inverted frustum of a cone, being provided with a suitable cap, so that it can be filled, and having an air-hole. This tank can be made of any preferred size; but I find one that holds about one gallon of fluid of the best size.

The numerals 57 and 58 designate two metal straps which pass around and are fastened to the under side of the tank and are fastened to the lower side of the plow-handles. Thus the tank is located far enough downwardly so that it will be out of the way of the cable and other operative parts of the device. Projecting from the lower end of this tank is a faucet 59, whose end lies in between the clamps and immediately above the upper edge of the moldboard and below the lower edges of the guide-plates, being located in close relation to the rear face of the ribbon-spring, so that the fluid as it passes out is projected onto the back of the spring and will pass down the moldboard and against the cutting and long cleaning knives.

The numeral 60 designates a valve-stem which is provided with an opening 61 and has a handle 62.

The numeral 63 designates a coil-spring which encircles the shank of the stem and has one end connected to the handle and the other end fastened to the faucet. Said parts are so disposed and related that the handle lies in line with the plates that clamp the rope or cable to the spring and project upwardly, so that the spring keeps the faucet normally closed. When the rope-clamp is at or near the limit of its downward movement, which is determined by the engagement with the heads of the bolts with the outer guide-plate that connects the clamp, it comes in engagement with the handle and forces the same downward, so that the fluid is allowed to pass out against the spring and trickle down the moldboard, the knife being located near the bottom of the latter, so that any earth sticking to the moldboard is rendered more plastic and can be more quickly removed when the cleaning and cutting knives again ascend.

I will now briefly describe the operation of the various parts of my improved plow-cleaner.

My plow-cleaner can be used either when the plow is in use and sunk deeply in the soil or when it is idle, the operation of the various parts being in no wise interfered with. The plowman turns the crank-handle away from him. When this happens, the ribbon-spring is forced downwardly, carrying with it the cleaning and cutting knives, and the former scrapes or cuts from the moldboard any earth that has adhered thereto. When the knife is at or near the limit of its downward movement, the faucet is tripped and the fluid passes out of the tank and moistens any earth that remains on the moldboard, the spring, or the knives. When the handle is turned back again, the knives are retracted, and both the cutting and cleaning knives, and more especially the former, act to scrape off the remaining earth under the spring and on the moldboard and to lift it up over the edge of the latter and out of the way. During the return movement of the parts the faucet is closed, so that the supply of fluid is cut off.

Owing to the disposition of the handle and the relation of the parts of the device, said handle can be reciprocated rapidly, so that the moldboard can be kept clean continually, whether the plow is idle or not, and the whole device requires but little energy to satisfactorily operate it.

It is obvious that many slight and immaterial changes might be resorted to in manufacturing the different parts of my improved plow-cleaner, but without impairing its efficiency in any manner, and hence it is to be understood that I do not limit myself to the precise construction herein shown and described, but consider that I am entitled to all such variations as come within the spirit and scope of the invention.

Having thus described my invention, what I claim as new, and desire to secure by Letters Patent, is—

1. In a plow-cleaner, the combination with a moldboard, of guides, a spring-arm slidable in the guides, a cleaning-knife connected to the flexible arm and having upper and lower sharpened scraping edges, both inclined in relation to the longitudinal axis of the spring-arm, and means for moving said arm.

2. In a plow-cleaner, the combination with a moldboard, of guides, a spring-arm slidable in said guides, a cleaning-knife connected to said arm, and a cutting-knife also connected to the arm.

3. In a plow-cleaner, the combination with a moldboard of guides, a flexible arm slidable in the guides, a cleaning-knife connected to the spring-arm at one side thereof, a cutting-knife also connected to the same side of the spring-arm and having an edge inclined to the longitudinal axis of the latter, and means for moving the arm.

4. In a plow-cleaner, the combination with a moldboard, of guides, a flexible arm slidable in the guides, a scraper or cleaner bearing on the spring-arm, a cleaning-knife connected to the arm, and means for moving the arm.

5. In a plow-cleaner, the combination with a moldboard, of clamps secured thereto, guide-plates connecting the clamps and adjustable in relation thereto, guide-standards connected to the clamps, an adjustable connection between the guide-standards, an arm slidable in the guide-standards and between the guide-plates, a cleaning-knife connected to the arm and adapted to scrape the moldboard, and means for moving said arm.

6. In a plow-cleaner, the combination with a moldboard, means for fastening the clamps to the latter, guide-plates provided with a series of openings, guide-standards provided with a series of openings, bolts passing through the respective clamps and the guide standards and plates, a cross-piece, bolts passing through the cross-piece and the guide-standards, an arm moving in the guide-standards and between the guide-plates, a cleaning-knife connected to the arm, and means for moving the arm and the knife.

7. In a plow-cleaner, the combination with a moldboard, of U-shaped clamps straddling the moldboard, clamping-plates located in the clamps, guide-plates provided with sets of openings and located on opposite sides of the clamping-plates, guide-standards, one of which is provided with a series of openings, bolts passing through the clamps, the guide-plates and the guide-standards, a cross-piece provided with a series of openings, bolts passing through the cross-piece and the standards, an arm slidable in the guide-standards and between the guide-plates, a cleaning-knife carried by said arm, and means for moving the arm.

8. In a plow-cleaner, the combination with a moldboard, of guides, an arm slidable in the guides, a cleaning-knife connected to the arm, a lower pulley, an upper pulley, a crank connected to the latter, and an endless cable or equivalent device passing around said pulley and connected to the slidable arm.

9. In a plow-cleaner, the combination with a moldboard, of guides, an arm slidable in the guides, a cleaning-knife carried by the guides, a lower pulley, a sprocket-wheel, a handle connected to the sprocket-wheel, a cable passing around the lower pulley and connected to the slidable arm, and a sprocket-chain connected to the ends of said cable and passing around the sprocket-wheel.

10. In a plow-cleaner, the combination with a moldboard, of guides, an arm slidable in the guides, a cleaning-knife connected to the arm and adapted to scrape the moldboard, a lower pulley, an upper pulley, a roller having its axis located at right angles to the upper pulley, an endless cable or equivalent device passing around the pulley and connected to the arm, and means for moving said cable.

11. In a plow-cleaner, the combination with a moldboard, of guides, a cleaning-knife connected to the arm and adapted to scrape the moldboard, a lower pulley, an upper pulley, a roller having its axis located at right angles to the upper pulley, a sprocket-wheel, a crank-handle connected to the sprocket-wheel, a cable passing over the pulley and connected to the slidable arm, and a sprocket-chain connected to the end of the cable and passing around the sprocket-wheel.

12. In a plow-cleaner, the combination with a moldboard, of a cleaning-knife therefor, means for operating said cleaning-knife, a tank, a faucet leading from said tank and adapted to deliver the fluid on the moldboard, and mechanism governing the flow of the fluid through the passage which is operated by the movement of the cleaning-knife.

13. In a plow-cleaner, the combination with a cleaning-knife, and means for operating said knife, of a tank, a faucet leading from the tank and adapted to deliver the fluid onto the moldboard, a rotatable valve-stem having an opening therethrough and provided with a handle, and a coil-spring encircling the valve-stem and having the portion connected to the handle and another portion fastened to the faucet, said spring being adapted to normally prevent passage of the fluid through the faucet, and means operated by the movement of the knife to open the faucet by turning the handle thereof.

14. In a plow-cleaner, the combination with a moldboard, of guides, an arm slidable in the guides, a cleaning-knife connected to the arm and adapted to scrape the moldboard, a tank, a faucet leading from said tank and adapted to deliver the fluid between the guides and onto the moldboard and arm, and valve mechanism governing the supply of fluid which is operated by the movement of the knife.

In testimony whereof I have signed this specification in the presence of two subscribing witnesses.

JACOB B. YEAGLEY.

Witnesses:
  W. C. COLLINS,
  J. W. YEAGLEY.